FREDERICK MUTIMER.

Improvement In Screw-Bolts.

No. 121,060.  Patented Nov. 21, 1871.

Witnesses.
Albert Gunsaul
S. B. Wilkins

Inventor.
Frederick Mutimer

UNITED STATES PATENT OFFICE.

FREDERICK MUTIMER, OF ROCKFORD, ILLINOIS.

IMPROVEMENT IN SCREW-BOLTS.

Specification forming part of Letters Patent No. 121,060, dated November 21, 1871.

*To all whom it may concern:*

Be it known that I, FREDERICK MUTIMER, of Rockford, in the county of Winnebago and State of Illinois, have invented certain Improvements in Screw-Bolts, of which the following is a specification:

My invention relates to the construction of bolts; and consists in providing a bolt of such form as will adapt it to the more general purposes for which bolts of various forms are employed, such as bolting iron to iron, iron to wood, wood to wood, &c.

Figure 2:
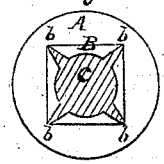
Figure 1:
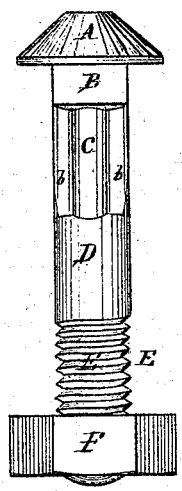
Figure 3:
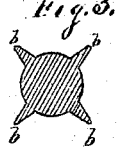
Figure 4:
Figure 5:
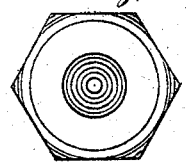
Figure 7:
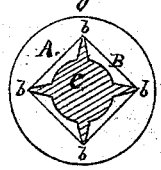

Figure 1 represents a side view of the bolt. Fig. 2 is a sectional view, showing the circular head, rectangular, and flanged portion of the shaft. Fig. 3 is a sectional view of the flanged portion of the shaft. Fig. 4 is a section of the shaft between the flanged and threaded portions. Fig. 5 represents the screw-nut. Figures from 6 to 10, inclusive, are different views of the same bolt.

Figure 6:
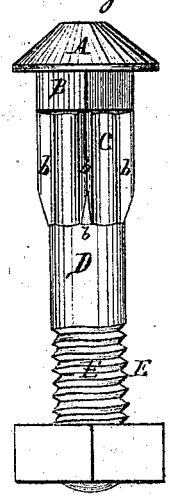
Figure 8:
Figure 9:
Figure 10:
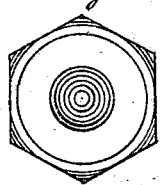

The bolt, represented at Figs. 1 and 6, is divided into sections, to wit, A, B, C, D, E, and nut F, in which A is the head of the bolt, which may be of any of the usual or similar forms. B is the portion of the shaft of the bolt contiguous to the head, and is of rectangular form, and designed to prevent the bolt from turning when used in iron. C is the portion of the shaft contiguous to the rectangular portion B, and is provided with flanges $b$ at the angles of the rectangular portion B. The diameter of the bolt through the flanges $b$ is designed to be about equal to the diagonal of the rectangular portion, and the flanges $b$ rise above the round portion of the shaft. These flanges are designed to prevent the bolt from turning when used in wood. D is the round portion of the shaft, the diameter of which is about equal to the side of the rectangular portion B. E is the portion of D which is screw-threaded to receive the screw-nut F.

I claim as my invention—

The screw-bolt herein described, composed of the head A, square part B, part C having the projecting ribs $b$, round part D, and screw part E, as a new article of manufacture.

FREDERICK MUTIMER.

Witnesses:
GILBERT GUNSAUL,
S. B. WILKINS.

(14)